(No Model.)
H. C. KEELER.
AUTOMATIC WEIGHING SCALE.
No. 311,010. Patented Jan. 20, 1885.
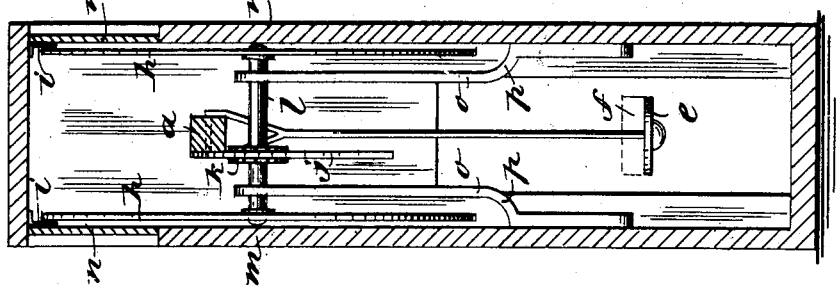
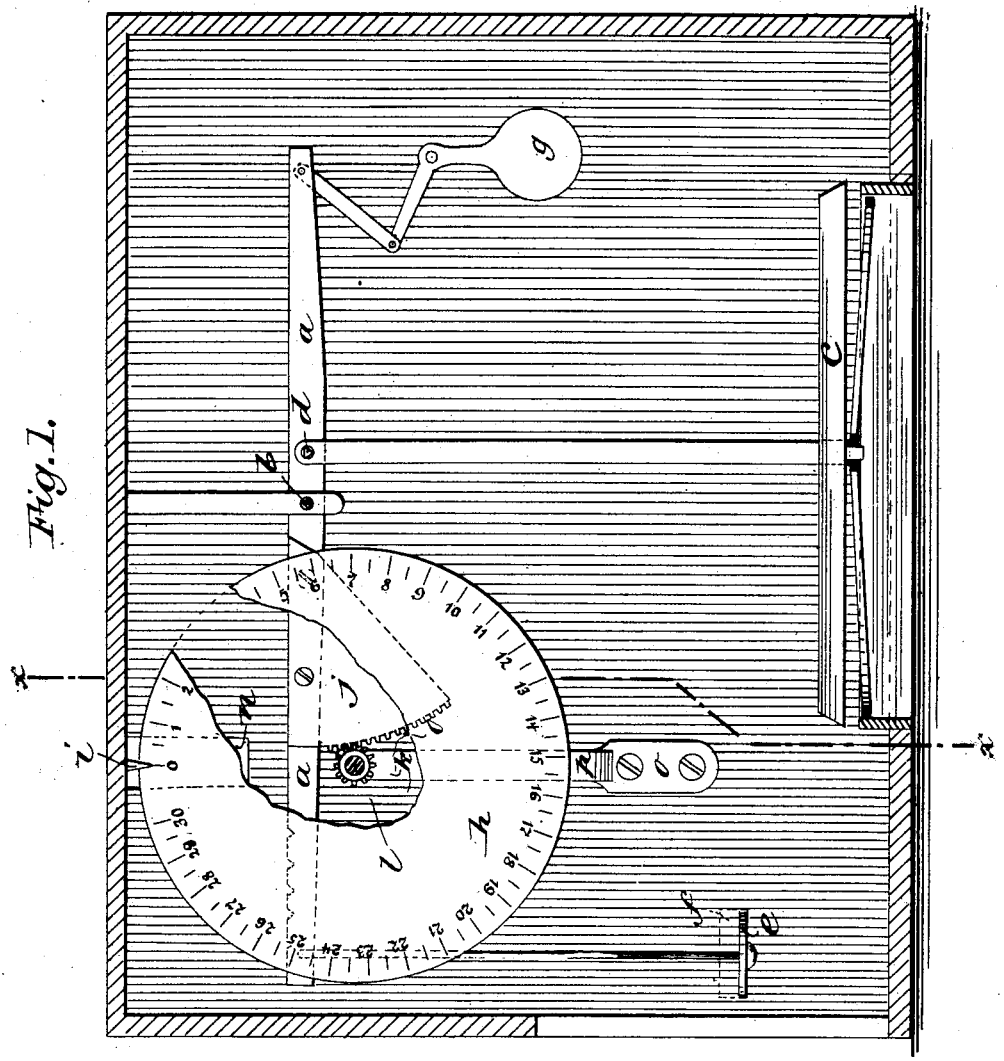
WITNESSES:
H. W. Beyer
C. Sedgwick
INVENTOR:
H. C. Keeler
BY Munn & Co
ATTORNEYS.

UNITED STATES PATENT OFFICE.

HENRY C. KEELER, OF OGDEN, UTAH TERRITORY.

AUTOMATIC WEIGHING-SCALE.

SPECIFICATION forming part of Letters Patent No. 311,010, dated January 20, 1885.

Application filed April 7, 1884. (No model.)

*To all whom it may concern:*

Be it known that I, HENRY C. KEELER, of Ogden, in the county of Weber and Territory of Utah, have invented a new and Improved Weighing-Scale, of which the following is a full, clear, and exact description.

My invention relates to scales having a revolving ial and a stationary pointer; and it consists in the peculiar construction and arrangement of parts, as hereinafter fully described, and pointed out in the claims.

Reference is to be had to the accompanying drawings, forming part of this specification, in which similar letters of reference indicate corresponding parts in both the figures.

Figure 1 is a sectional elevation of the case inclosing the beam and its adjuncts, and Fig. 2 is a section of Fig. 1 on the line $x$ $x$.

The beam $a$ has its fulcrum at $b$. The platform $c$ is suspended from the beam at $d$, and the long arm of the beam has the usual weight-hanger, $e$, for the weights $f$, employed to balance the quantities greater than the capacity of the graduated portion of the scale. The pendulum-weight $g$ is pivoted to the casing, and is connected with the short arm of the beam, as usual in the employment of such weights. I now propose to substitute a revolving dial, $h$, and a stationary index, $i$, for the movable index and stationary dial commonly used with pendulum-scales, by attaching a toothed segment, $j$, to the scale-beam $a$, which segment is constructed on the radius of the fulcrum $b$, and gears with a pinion, $k$, on the shaft $l$, on which the dial is mounted, to be rotated by the swing of the beam. The segment and the pinion are duly proportioned for causing the dial to make one revolution by the swing of the beam through the range of its travel. It will be seen that with a dial thus arranged the graduation of the scale may be very much larger and plainer than with a pointer of equal radius.

For the convenience of reading the record from both sides of the case $m$ I arrange the shaft $l$ to extend across the inclosed space from side to side of the case, and fit a dial, $h$, on each end, with an index, $i$, for each dial, and with a glazed opening, $n$, through the case for each dial. The shaft $l$ is supported by the brackets $o$, attached to the sides of the case $m$ below the dials, and having an offset at $p$, projecting thence back of the sides of the case, suitably to enable the dials to be located between the brackets and close to the sides of the case. An especial advantage of this arrangement is that the record of the weight may always be seen at one and the same place and through a small glazed opening, instead of having to follow the pointer along the whole range of its movement, and for this reason the invention will also be useful with beams having the usual shifting weights, with which it is sometimes desirable to use an index and scale.

If desired, but one dial may be used, as in the cheaper class of scales.

Having thus described my invention, what I claim as new, and desire to secure by Letters Patent, is—

1. The combination, with the shaft $l$, the pinion $k$, dial $h$, and pointer $i$, of the beams $a$, provided with the toothed segment $j$, the pendulum-weight $g$ on the short arm of said beam, and the platform $c$, suspended from the beam $a$ between its fulcrum and the pendulum-weight, substantially as herein shown and described.

2. The combination, with the shaft $l$, pinion $k$, dial $n$, and fixed pointer $i$, of the beam $a$, provided with the toothed segment $j$, the pendulum-weight $g$ on the short arm of the beam, the weight-hanger $e$ on the long arm of the beam, and the platform $c$, substantially as herein shown and described.

3. The combination, with the casing $m$, provided with opposite openings $n$ and fixed pointers $i$, of the shaft $l$, journaled in supports in the case, and provided with the dial $h$ and the pinion $k$, and the beam $a$, provided with the toothed segment $j$, the pendulum-weight $g$, and the suspended platform $c$, substantially as herein shown and described.

HENRY C. KEELER.

Witnesses:
JNO. KELLY,
OWEN D. CRANE.